March 22, 1927.  
F. A. DECKER  
BORING TOOL  
Filed Dec. 2, 1924  
1,622,094
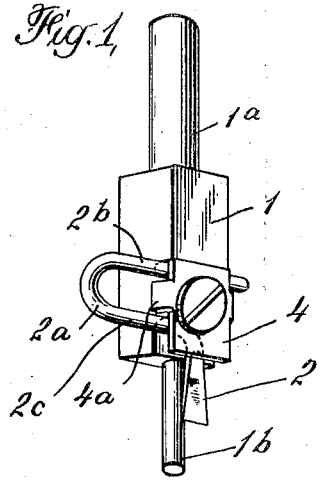
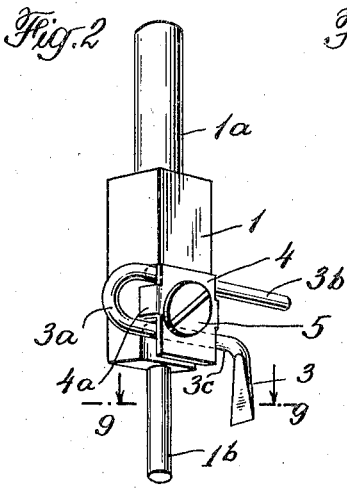
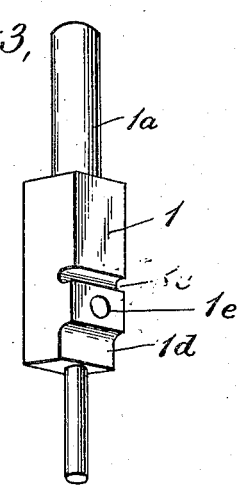
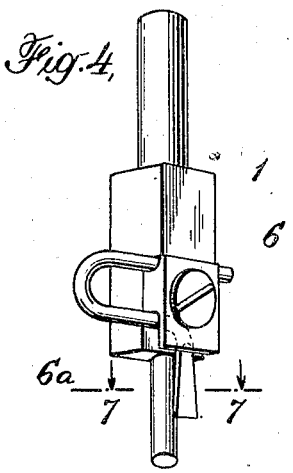
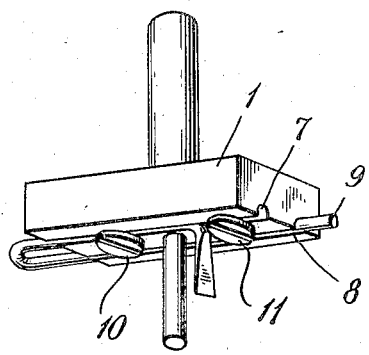
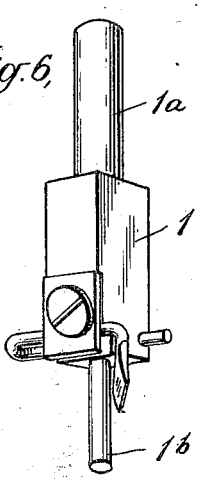
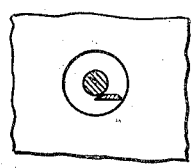
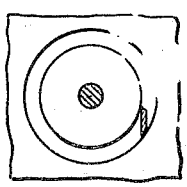
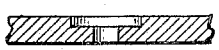
INVENTOR  
Frank A. Decker.  
BY Pennie, Davis, Marvin & Edmonds  
ATTORNEYS Patented Mar. 22, 1927.

1,622,094

UNITED STATES PATENT OFFICE.

FRANK A. DECKER, OF NEW YORK, N. Y., ASSIGNOR TO LOUIS G. PACENT, OF WINFIELD, NEW YORK.

BORING TOOL.

Application filed December 2, 1924. Serial No. 753,420.

This invention has for its object the provision of an inexpensive, adjustable boring tool which is adapted to meet the needs of persons having only infrequent occasions to drill or bore holes, but whose requirements, as to the sizes of holes vary to such an extent that a considerable number of twist drills would otherwise be necessary to meet their requirements.

The boring tools representing the preferred embodiments of the invention were designed primarily to meet the needs of builders of homemade radio sets, but of course the utility of the tools herein described is not by any means limited to that particular field.

The features characterizing the preferred embodiments hereinafter described are, (1) That the tools are capable of boring holes of much smaller size than the usual adjustable boring tool, and so far as it has been possible to ascertain, smaller by a considerable margin than any adjustable boring tool which has heretofore been put upon the market, (2) That these tools are of rugged and simple construction and therefore unlikely to get out of order, and, (3) That they are inexpensive to manufacture and can therefore be sold at a very low price.

The structures of the preferred embodiments comprise in each instance, a body portion having an integral shank, adapted to be inserted in the chuck of a drill press or the like and a pilot of small diameter for guiding the cutter. The body portion is provided with milled grooves or the equivalent to receive a cutter of novel form and a clamping plate is provided for holding the cutter rigidly in place. The cutter, both individually and in combination with the remaining elements of the device, presents a novel idea in that it is made of ordinary drill rod or the like and is formed with a return bend so that its cutting edge is adapted to be adjusted toward and away from the center of rotation of the tool, while at the same time it is admirably adapted to be rigidly clamped to the body of the tool in any radial position by very simple clamping means.

The invention, it is thought will be more clearly understood from the following detailed description in conjunction with the illustrations in the accompanying drawing, wherein—

Figs. 1 and 2 are each perspective views of a boring tool illustrating different adjustments of the cutter, Fig. 3 is a perspective view of the body portion of the tool shown in Figs. 1 and 2, Fig. 4 is a perspective view of a slightly modified form of the invention, as compared with those of Figs. 1 to 3 inclusive, Figs. 5 and 6 each represent modified embodiments of the invention, Fig. 7 is a cross-sectional view taken along the line 7—7 of Fig. 4, Fig. 8 is a cross-sectional view of a radio panel or the like, illustrating a counter bored hole such as may be made by any one of the tools shown in the drawing and particularly with the tool setting illustrated in Figs. 4 and 7, Fig. 9 is a cross-sectional view taken along the line 9—9 of Fig. 2, and Fig. 10 is a cross-sectional view of an object such as a panel of a radio set through which a comparatively large hole has been partly bored.

In each of the Figures 1 to 6 inclusive, the tool illustrated comprises a body portion 1, having an integral shank $1^a$ which is adapted to be held in the chuck of a breast drill or drill press and a pilot $1^b$ of small diameter. The body portion of the boring tool is milled at $1^c$ and $1^d$ as shown in Fig. 3 to receive a cutter which in Fig. 1 is designated by reference numeral 2 and in Fig. 2 by reference numeral 3. The cutter in each instance is made of ordinary drill rod or the like and is formed with a return bend $2^a$, $3^a$, and has parallel side members $2^b$, $2^c$, $3^b$, $3^c$, one of which fits in the groove $1^c$ and the other in the groove or recess $1^d$. Clamping plate 4, having a tail-piece $4^a$ to prevent its turning, retains the cutter and is held in place by means of a flat head screw 5 which is threaded into a tapped hole $1^e$ in the body of the tool. The cutter in each instance is slidable in a direction at right angles to the axis of rotation of the device and it is evident that the cutting edge be adjusted into any position between maximum and minimum limits with respect to the axis of rotation. The cutter 3 shown in Fig. 2 differs from the cutter 2 shown in Fig. 1 merely in that its cutting edge is ground in different angular relation to the axis of rotation. The cross-sectional views of Fig. 7 indicates the closeness with which the cutting edges may be drawn to the pilot.

Boring tools which have actually been made in accordance with Figs. 1 and 2 are capable of boring holes as small as one-eighth inch diameter. The maximum size hole which may be bored with this device is of course limited by the dimensions of the cutting tool and the tendency to chatter when the overhanging cutting edge is not sufficiently supported.

Fig. 4 illustrates a slightly modified design wherein the clamping member 6 is in the form of a milled block having a portion 6ª which projects between the parallel sides of the cutter. In this instance a single right angular recess is milled into the body portion of the tool instead of the grooving shown in Fig. 3. Fig. 4 is included merely to illustrate one of the many possible modifications of which the invention is capable.

Figs. 5 and 6 are likewise included for the purpose of showing other possible alternative embodiments of the invention. In the boring tool shown in Fig. 5, grooves 7 and 8, in which the cutter 9 is seated, are milled on the bottom face of the body portion 1 and two flat head screws 10 and 11 are provided for holding the cutter in position. While the boring tool shown in Fig. 5 is in all respects the equivalent of those in the other figures it is not considered as desirable from a manufacturing standpoint on account of its greater cost of production.

In the alternative embodiment of Fig. 6 grooves or recesses are provided on opposite sides of the body portion and the cutting tool is accordingly somewhat modified as clearly shown. In this example the cutting edge of the cutter is shown ground to function as a countersinking tool.

In operation a hole large enough to let in the pilot is drilled with a twist drill through the panel or other object to be bored, after which, with the cutting edge set to the proper radius, the hole is enlarged with the boring tool, as clearly illustrated in Fig. 10 in which there is shown a partially bored hole.

The invention is, of course, capable of an almost limitless number of modifications and should be construed accordingly.

I claim:

A boring tool comprising, in combination a body portion having an integral shank adapted to be engaged by a chuck, a pilot associated with said body portion and arranged co-axially with said shank, a cutter formed of a rod comprising two substantially parallel side portions spaced apart and formed by means of a return bend, said body portion having at least one recess adapted to seat the parallel side portions of said cutter, and clamping means for grippingly securing said cutter in the recess.

In testimony whereof I affix my signature.

FRANK A. DECKER.